United States Patent
Sarkar et al.

(10) Patent No.: US 8,160,034 B1
(45) Date of Patent: Apr. 17, 2012

(54) DYNAMIC DETERMINATION OF EV-DO CONTROL-CHANNEL BIT RATE BASED ON FORWARD-LINK-TIMESLOT UTILIZATION, CONTROL-CHANNEL OCCUPANCY, AND AMOUNT OF BUFFERED FORWARD-LINK TRAFFIC DATA

(75) Inventors: Debasish Sarkar, Irvine, CA (US); Sachin R. Vargantwar, Overland Park, KS (US); Siddharth S. Oroskar, Overland Park, KS (US); Manoj Shetty, Overland Park, KS (US); Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 593 days.

(21) Appl. No.: 12/207,158

(22) Filed: Sep. 9, 2008

(51) Int. Cl.
*H04J 3/00* (2006.01)

(52) U.S. Cl. .......................... 370/336; 370/498

(58) Field of Classification Search .................. None
See application file for complete search history.

(56) References Cited

U.S. PATENT DOCUMENTS

| | | | |
|---|---|---|---|
| 4,745,408 | A | 5/1988 | Nagata et al. |
| 5,378,067 | A | 1/1995 | Severson et al. |
| 6,075,443 | A | 6/2000 | Schepps et al. |
| 6,898,198 | B1 | 5/2005 | Ryan et al. |
| 2002/0071419 | A1 | 6/2002 | Paranchych et al. |
| 2003/0013447 | A1 | 1/2003 | Persson et al. |
| 2003/0093364 | A1 | 5/2003 | Bae et al. |
| 2003/0123406 | A1 | 7/2003 | Yavuz et al. |
| 2003/0157955 | A1* | 8/2003 | Jarvisalo et al. ............. 455/522 |
| 2003/0218974 | A1 | 11/2003 | Zuniga ......................... 370/229 |
| 2007/0070945 | A1* | 3/2007 | Wang et al. ................... 370/329 |

OTHER PUBLICATIONS

Non-Final Office Action from U.S. Appl. No. 11/557,759, mailed Oct. 25, 2010.
Non-Final Office Action from U.S. Appl. No. 11/557,759, mailed Sep. 15, 2009.
Final Office Action from U.S. Appl. No. 11/557,759 mailed Apr. 13, 2011.
Unpublished U.S. Appl. No. 11/557,759, entitled "Dynamic Determination of EV-DO Control-Channel Bit Rate Based on Forward-Link Timeslot Utilization," filed Dec. 12, 2007 in the name of Narendran et al.
Final Office Action from U.S. Appl. No. 11/557,759, mailed Mar. 9, 2010.
Advisory Action from U.S. Appl. No. 11/557,759, mailed May 26, 2010.

* cited by examiner

*Primary Examiner* — Jianye Wu

(57) ABSTRACT

Methods and systems provide dynamic determination of a control-channel bit rate. An access node provides service on a carrier comprising active and idle timeslots, active timeslots comprising a data channel for carrying a control channel at a bit rate that can be set to a lower value or a higher value, and traffic channels. The access node determines whether the number of active timeslots over a time period is less than a first threshold. If so, the access node sets the bit rate to the lower value. If not, the access node sets the bit rate to the higher value if at least one of the following is true: (a) control-channel occupancy exceeds a second threshold, (b) the amount of data in a traffic buffer exceeds a third threshold, and (c) control-channel occupancy exceeds a fourth threshold and the amount of data in the traffic buffer exceeds a fifth threshold.

14 Claims, 4 Drawing Sheets

DYNAMIC DETERMINATION OF EV-DO CONTROL-CHANNEL BIT RATE BASED ON FORWARD-LINK-TIMESLOT UTILIZATION, CONTROL-CHANNEL OCCUPANCY, AND AMOUNT OF BUFFERED FORWARD-LINK TRAFFIC DATA

BACKGROUND

1. Technical Field

The present invention relates to wireless communications, and, more particularly, to management of wireless communications between Evolution Data Optimized (EV-DO) access nodes and EV-DO access terminals.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a CDMA protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which includes one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet connection between the access node and the PDSN for the access terminal. The access node also facilitates establishment of a data link (e.g., a point-to-point protocol (PPP) connection) between the access terminal and the PDSN, and perhaps assignment (e.g., by the PDSN or by a Mobile-IP home agent) of an IP address to the access terminal.

Once those steps (and perhaps others) are complete, the access terminal has a session with the access node, and can therefore communicate over the packet-data network via the access node and the PDSN. Typically, the air-interface connection is then torn down, freeing up those radio resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate packet-data communication, it sends another connection request to the access node, which will again assign a traffic channel to the access terminal. If the access node receives data addressed to the access terminal, the access node would typically page the access terminal, and assign it a traffic channel. The access terminal can then engage in packet-data communication over the packet-data network, using the newly-assigned traffic channel, as well as the previously-established IP address, radio-packet connection, and data link.

Note that an access node may, in a wireless coverage area such as a cell or sector, provide service on one or more carrier frequencies ("carriers"). When service is provided on only one carrier, the access terminal will, by default, communicate over a traffic channel on that carrier. When service is provided on more than one carrier, the access node will select one of those carriers on which to assign a traffic channel to the access terminal. In general, each carrier may occupy a 1.25-MHz-wide band of the RF spectrum. Furthermore, a carrier may actually be a pair of 1.25-MHz-wide bands, in systems that use a frequency-division-duplex (FDD) approach, where access terminals receive on one frequency, and transmit on another.

In addition to sending user traffic to access terminals over traffic channels, access nodes also transmit control information to access terminals over a control channel, which, on a given carrier in a given sector, takes the form of certain timeslots on the forward link. In fact, certain timeslots on the forward link are reserved for what is known as a data channel, which includes traffic channels and the control channel. Thus, the data channel can transmit user traffic or control-channel information. Note that a traffic channel carries user traffic to a single access terminal, while the control channel carries both access-terminal-directed messages and broadcast messages. Note also that a timeslot during which user traffic or control-channel information is transmitted (i.e. a timeslot that includes the data channel) is referred to as active, while a timeslot during which no user traffic or control-channel information is transmitted (i.e. a timeslot that effectively does not include the data channel) is referred to as idle.

SUMMARY

Methods and systems are provided for dynamic determination of an EV-DO control-channel bit rate based on forward-link-timeslot utilization, control-channel occupancy, and amount of buffered forward-link traffic data. In one aspect, an exemplary embodiment may take the form of a method. In accordance with the method, an access node provides service to access terminals on a carrier in a wireless coverage area, wherein the carrier comprises timeslots that can be active or idle, wherein active timeslots comprise a data channel, wherein idle timeslots do not comprise the data channel, wherein the data channel is arranged to carry at least one traffic channel, wherein the data channel is also arranged to carry a control channel at a bit rate that can be set to a first value or a second value, wherein the second value is greater than the first value.

The access node determines a measured number of active timeslots on the carrier in the wireless coverage area over a first time period, and further determines whether the measured number is less than a first threshold. If the measured number is less than the first threshold, the access node sets the bit rate to the first value. If the measured number is not less than the first threshold, the access node sets the bit rate to the second value if at least one of the following conditions is true: (a) that a control-channel occupancy of the control channel exceeds a second threshold, (b) that an amount of data in a traffic buffer exceeds a third threshold, and (c) that both (i) the control-channel occupancy exceeds a fourth threshold and (ii) the amount of data in the traffic buffer exceeds a fifth threshold.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
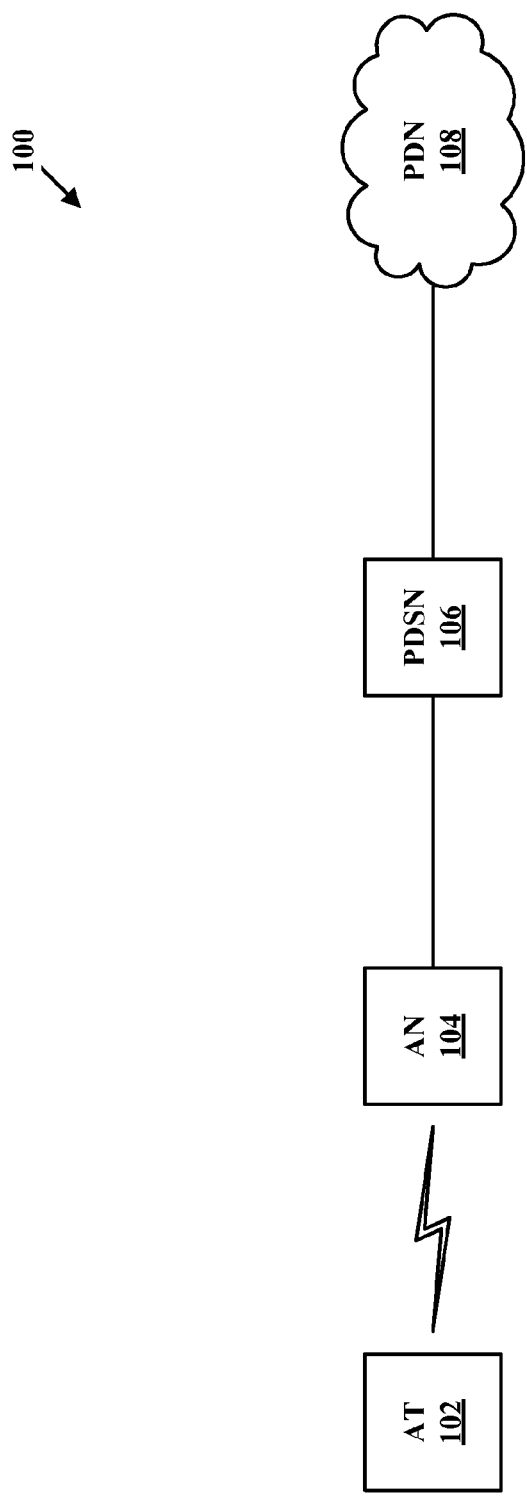
FIG. 1 is a simplified block diagram of a communication system, in accordance with exemplary embodiments.

In current EV-DO implementations, control-channel information—such as pages and other administrative messages—is transmitted to access terminals on the control channel at a bit rate of either 38.4 kilobits per second (kbps) or 76.8 kbps. When the control-channel bit rate is set to 38.4 kbps, 16 timeslots are needed to transmit a standard amount of control-channel information. When the control-channel bit rate is set to 76.8 kbps, however, only 8 timeslots are needed to transmit that same amount of control-channel information. In general, the more timeslots that are used for the control channel, the fewer timeslots there will be for traffic channels; conversely, the fewer timeslots that are used for the control channel, the more timeslots there will be for traffic channels.

Furthermore, at a given level of access-node forward-link transmission power, access terminals tend to receive information on the control channel more reliably and robustly when the bit rate is set to 38.4 kbps than they do when the bit rate is set to 76.8 kbps. The reason for this is that access terminals have an easier time decoding the type of coding that is used when the bit rate is set to 38.4 kbps than they do decoding the type of coding that is used when the bit rate is set to 76.8 kbps. In general, for the same amount of control-channel information, more forward error correction (FEC) information can be included over the 16 timeslots used at 38.4 kbps than over the 8 timeslots used at 76.8 kbps. This means that access terminals will correctly receive the control-channel information more often at 38.4 kbps than at 76.8 kbps, and that, therefore, less retransmission of control-channel information will be needed.

Thus there are tradeoffs between (i) setting the control-channel bit rate to 38.4 kbps, which will result in the transmission of the control-channel information being more robust, but which will also result in using more timeslots for the control channel (and thus having fewer for traffic channels), and (ii) setting the control-channel bit rate to 76.8 kbps, which will result in using fewer timeslots for the control channel (and thus having more for traffic channels), but which will also result in the transmission of the control-channel information being less robust.

As presently contemplated, in accordance with the present invention, for a given carrier in a given sector, an EV-DO access node will determine whether, over a given time period, a low number or a high number of timeslots are utilized (i.e. active). If the determination is that a low number of timeslots were active over the time period (i.e. that the forward-link-timeslot utilization was below a first threshold), the access node will set the control-channel bit rate to 38.4 kbps, to take advantage of the more robust communication at that lower data (i.e. bit) rate, at a time when the demand for timeslots is relatively low. If the determination is that a high number of timeslots were active over the time period (i.e. that the forward-link-timeslot utilization was above the first threshold), the access node will evaluate at least one of control-channel occupancy and the amount of data in a traffic buffer; note that each of these metrics are explained below.

If, in addition to the forward-link-timeslot utilization being above the first threshold, at least one of the following conditions is also true, the access node will set the control-channel bit rate to 76.8 kbps, to use fewer timeslots (and improve user-traffic throughput) for the control channel at a time when the demand for timeslots is relatively high. Otherwise, the access node will set the control-channel bit rate to 38.4 kbps.

The conditions are: (i) that the control-channel occupancy exceeds a second threshold; (ii) that the amount of data in the traffic buffer exceeds a third threshold; and (iii) that both (a) the control-channel occupancy exceeds a fourth threshold and (b) the amount of data in the traffic buffer exceeds a fifth threshold.

Note that, in some embodiments, these thresholds may be configurable. Furthermore, one or more of these thresholds may be equal to each other. For example, the second threshold could be equal to the fourth threshold. As another example, the third threshold may be equal to the fifth threshold. Furthermore, these thresholds may be expressed in any form, including but not limited to absolute values and percentages. In some embodiments, one or more of the above conditions may be eliminated from consideration when setting the bit rate.

Control-channel occupancy may be defined as a ratio of (a) the number of control-channel slots that are used for control-channel data over a time period (which may be the same or different as the time period referenced above for evaluating forward-link timeslot utilization) to (b) the total number of control-channel slots over that time period. Note that, if an access node does not have enough data to fill all of the available control-channel slots for a given instance of transmitting the control channel, the access node typically fills the unused slots with zeros.

Furthermore, the above-referenced traffic buffer may be a buffer in which the access node buffers bearer data that the access node receives over a backhaul connection for access terminals that the access node is serving, prior to transmitting that data to the appropriate access terminals; it is the amount of data in this traffic buffer that the access node may assess in connection with one or more embodiments, when setting the control-channel bit rate.

Finally, it should be noted that the above overview is meant to be illustrative and not limiting. That is, additional and/or different features may be present in some embodiments of the present invention. It should be noted as well that any description of an access node or other network element providing service or communicating according to EV-DO is by way of example; any suitable mode of wireless communication (e.g. protocol) may be used instead, such as 1xRTT CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node (AN) 104, a PDSN 106, and a packet-data network (PDN) 108. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. As such, access terminal 102 may include a user interface, a wireless-communication interface, a processor, and data storage comprising instructions executable by the processor for carrying out those access-terminal functions. The user interface may include buttons, a touch-screen, a microphone, and/or any other elements for receiving inputs from users, as well as a speaker, one or more displays, and/or any other elements for communicating outputs to users.

The wireless-communication interface may comprise an antenna and a chipset for communicating with one or more access nodes over an air interface. As an example, the chipset could be one suitable for engaging in EV-DO communications. The chipset or wireless-communication interface in general may also be able to communicate with a 1xRTT CDMA network, a Wi-Fi (IEEE 802.11) network, and/or one or more additional types of wireless networks. The processor and data storage may be any suitable components known to those of skill in the art. As examples, access terminal 102 could be or include a cell phone, a PDA, a computer, a laptop computer, a hybrid IS-2000/IS-856 device, and/or a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out those access-node functions. The communication interface may include one or more antennas and chipsets or other components for providing one or more EV-DO coverage areas such as cells or sectors, for communicating with access terminals such as access terminal 102 over an air interface. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

Figure 2:
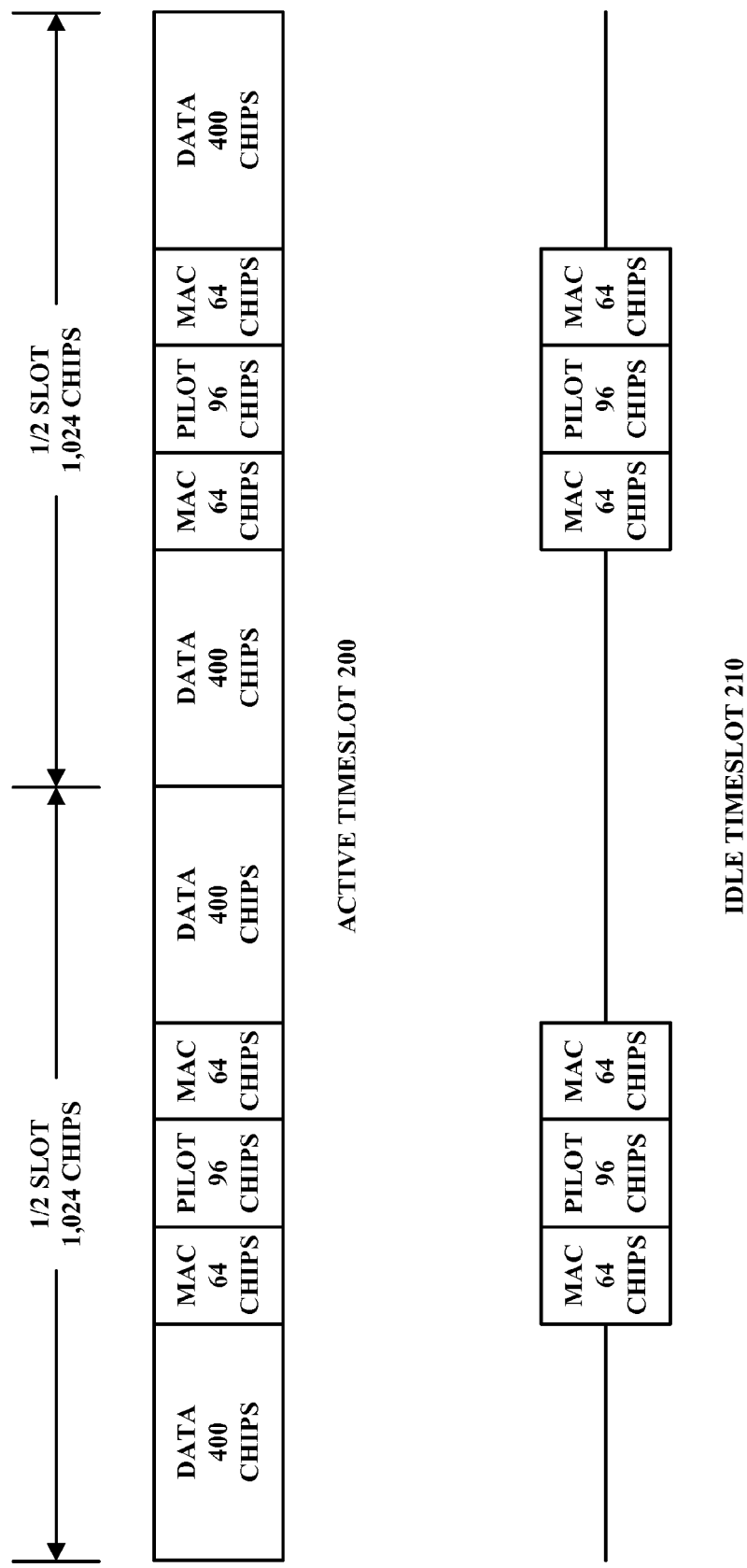
FIG. 2 is a timing diagram depicting an active timeslot and an idle timeslot, in accordance with exemplary embodiments.

Access node 104 may provide service to EV-DO access terminals on a number of carriers and in a number of wireless coverage areas, such as cells or sectors. As explained, forward-link transmissions on each carrier in each sector are divided into timeslots and, in turn, channels. FIG. 2 illustrates two examples of timeslots, which are each 2048 chips long. As shown, each timeslot is divided into two half slots of 1024 chips each, and each half slot is then divided into a 400-chip data channel, a 64-chip Media Access Control (MAC) channel, a 96-chip pilot channel, another 64-chip MAC channel, and another 400-chip data channel.

An active timeslot, such as active timeslot 200, is one that carries user traffic or control-channel information, and thus includes the data-channel segments, whereas an idle timeslot, such as idle timeslot 210, is one that carries no user traffic or control-channel information, and thus effectively does not include any data-channel segments. Note that, when transmitting idle timeslots, access node 104 may still transmit data—such as zeroes—during the times when it would transmit the data-segments of active timeslots.

Returning to FIG. 1, PDSN 106 may be any networking server or other device arranged to carry out the PDSN functions described herein. As such, PDSN 106 may include a communication interface, a processor, and data storage comprising instructions executable by the processor for carrying out those PDSN functions. The communication interface may include a wired packet-data interface such as an Ethernet interface for communicating with access node 104 and over PDN 108. Note that PDSN 106 may, instead or in addition, comprise a wireless-communication interface for communicating with PDSN 106 and over PDN 108. Note as well that PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

3. Exemplary Operation a. A First Exemplary Method

Figure 3:
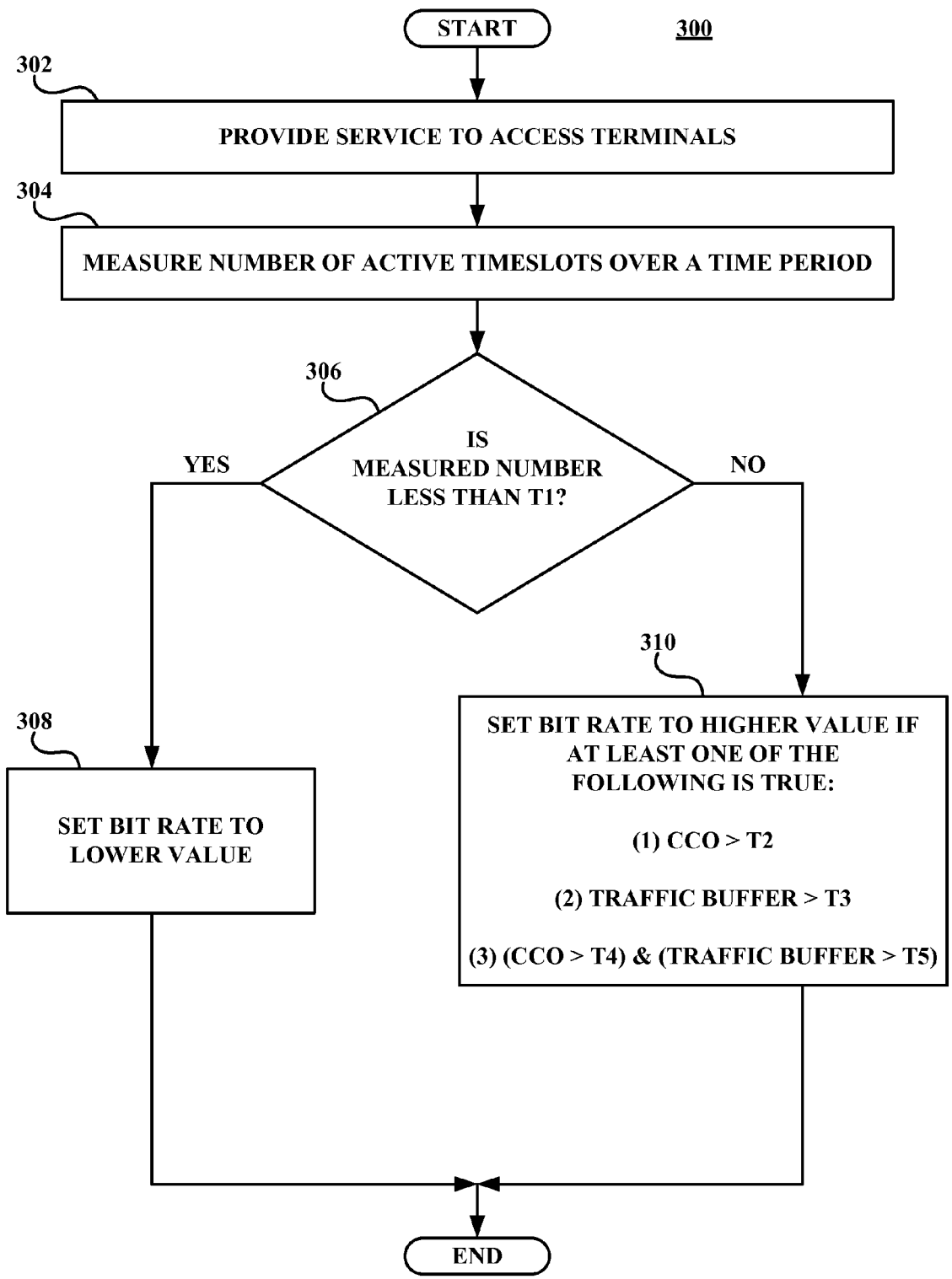
FIG. 3 is a flowchart of a method, in accordance with exemplary embodiments.

FIG. 3 depicts a flowchart of an exemplary method, in accordance with an exemplary embodiment. As shown in FIG. 3, method 300 begins at step 302, when access node 104 provides service to access terminals, such as access terminal 102, on a carrier in a wireless coverage area. As explained herein, the carrier comprises timeslots that can be active or idle, where active timeslots comprise a data channel, and idle timeslots do not. Furthermore, the data channel is arranged to carry at least one traffic channel, and is also arranged to carry a control channel at a bit rate that can be set to a first value or a second value, where the second value is greater than the first value.

At step 304, access node 104 determines a measured number of active timeslots on the carrier in the wireless coverage area over a first time period. At step 306, access node 104 determines whether the measured number is less than a first threshold (T1). If the measured number is less than T1, then at step 308, access node 104 sets the bit rate to the first value.

If the measured number is not less than T1, then at step 310, access node 104 sets the bit rate to the second value if at least one of the following is true: (a) a control-channel occupancy of the control channel exceeds a second threshold (T2), (b) an amount of data in a traffic buffer exceeds a third threshold (T3), and (c) both (i) the control-channel occupancy exceeds a fourth threshold (T4) and (ii) the amount of data in the traffic buffer exceeds a fifth threshold (T5).

These steps are explained in the following subsections. And it should be noted that, although method 300 is described herein as being carried out by access node 104, this is not required. In some embodiments, method 300 may be carried out specifically by an RNC or BTS. In other embodiments, method 300 could be carried out by one or more servers, a gateway, a proxy, a BSC, a PDSN, some other network element, or perhaps some combination of these. And other possibilities exist as well.

i. Provide Service to Access Terminals

At step 302, access node 104 provides service to access terminals, such as access terminal 102, on a carrier in a wireless coverage area. The service could be EV-DO service, perhaps in compliance with one or more industry standards such as IS-856, Rev. 0 and IS-856, Rev. A, both of which are incorporated herein by reference. Note that this wireless coverage area could be a cell or sector, as examples.

Furthermore, as explained, the carrier comprises timeslots that can be active or idle, where the active timeslots include a data channel, whereas the idle timeslots do not include—or effectively do not include—the data channel. The data channel is arranged to carry at least one traffic channel, and is also arranged to carry a control channel at a bit rate that can be set to a first value (such as 38.4 kbps) or a second value (such as 76.8 kbps).

ii. Determine Number of Active Slots Over a Time Period

At step 304, access node 104 determines a measured number of active timeslots on the carrier in the wireless coverage area over a first time period. In general, active timeslots are those that include the data channel, and thus transmit user-traffic information and/or control-channel information to one or more access terminals. However, step 304 could involve counting only the number of timeslots that include user-traffic information (and thus not control-channel information), or perhaps all timeslots that include either user-traffic information or control-channel information. Preferably, the number of active timeslots over the first time period will be counted basically immediately following the first time period. As examples of duration, the first time period could last in the neighborhood of ten seconds, thirty seconds, or one minute, though a time period of any length could be used.

iii. Determine Whether Number of Active Timeslots is Less than a First Threshold At step 306, access node 104 determines whether the number of active timeslots that was measured (i.e. counted) in step 304 is less than T1. Note that access node 104 may store this threshold, which may be a configurable and updateable parameter, and that step 306 may involve a simple comparison between the measured number and T1.

iv. If So, Set Control-Channel Bit Rate to Lower Value

At step 308, if the measured number is less than T1, access node 104 sets the control-channel bit rate on that carrier in that wireless coverage area to the first value. In this example, the first value is 38.4 kbps. Note that setting the bit rate to this lower-of-the-two values should increase the likelihood that the control-channel information transmitted to access terminals will be successfully received, though more (in this case twice as many) timeslots will be needed to transmit a standard amount of control-channel information (as compared with the bit rate of 76.8 kbps), which will reduce the number of timeslots available for user-traffic information.

v. If Not (and Control-Channel Occupancy and/or Amount of Data in Traffic Buffer Meet Certain Thresholds), Set Control-Channel Bit Rate to Higher Value At step 310, if the measured number is not less than T1, access node 104 sets the control-channel bit rate on that carrier in that wireless coverage area to the second value if it is also the case that at least one of the following conditions is true: (a) that a control-channel occupancy of the control channel exceeds T2, (b) that an amount of data in a traffic buffer exceeds T3, and (c) that both (i) the control-channel occupancy exceeds T4 and (ii) the amount of data in the traffic buffer exceeds T5. In this example, the second value is 76.8 kbps.

Note that setting the bit rate to this higher-of-the-two values will have the result of needing fewer (in this case half as many) timeslots to transmit a standard amount of control-channel information (as compared with the bit rate of 38.4 kbps), which will increase the number of timeslots available for user-traffic information, though decreasing the likelihood that the control-channel information transmitted to access terminals will be successfully received.

Note further that, after setting the bit rate to either the first or second value, access node 104 may then provide service to access terminals on the carrier in the wireless coverage area without changing the bit rate for an ensuing time period (that begins essentially immediately following the setting of the bit rate to the new value), where that ensuing time period has a duration greater than or equal to a duration of the first time period.

In general, access node 104 may accomplish the goal of dynamically adjusting the bit rate to timeslot utilization over a second time period, where that second time period is longer than the first time period. Access node 104 may accomplish this dynamic adjustment by repeatedly (i.e. periodically): (i) determining the number of active timeslots over a preceding time period that is substantially equal in duration to the first time period described above, (ii) determining whether that number is less than T1, and (iii) responsively setting the bit rate to the first value if that number is less than T1, or to the second value if (A) that number is not less than T1 and (B) at least one of the following conditions is true: (a) that a control-channel occupancy of the control channel exceeds T2, (b) that an amount of data in a traffic buffer exceeds T3, and (c) that both (i) the control-channel occupancy exceeds T4 and (ii) the amount of data in the traffic buffer exceeds T5. Thus, access node 104 may dynamically react to the capacity conditions on the EV-DO carrier in setting the control-channel bit rate.

b. A Second Exemplary Method

Figure 4:
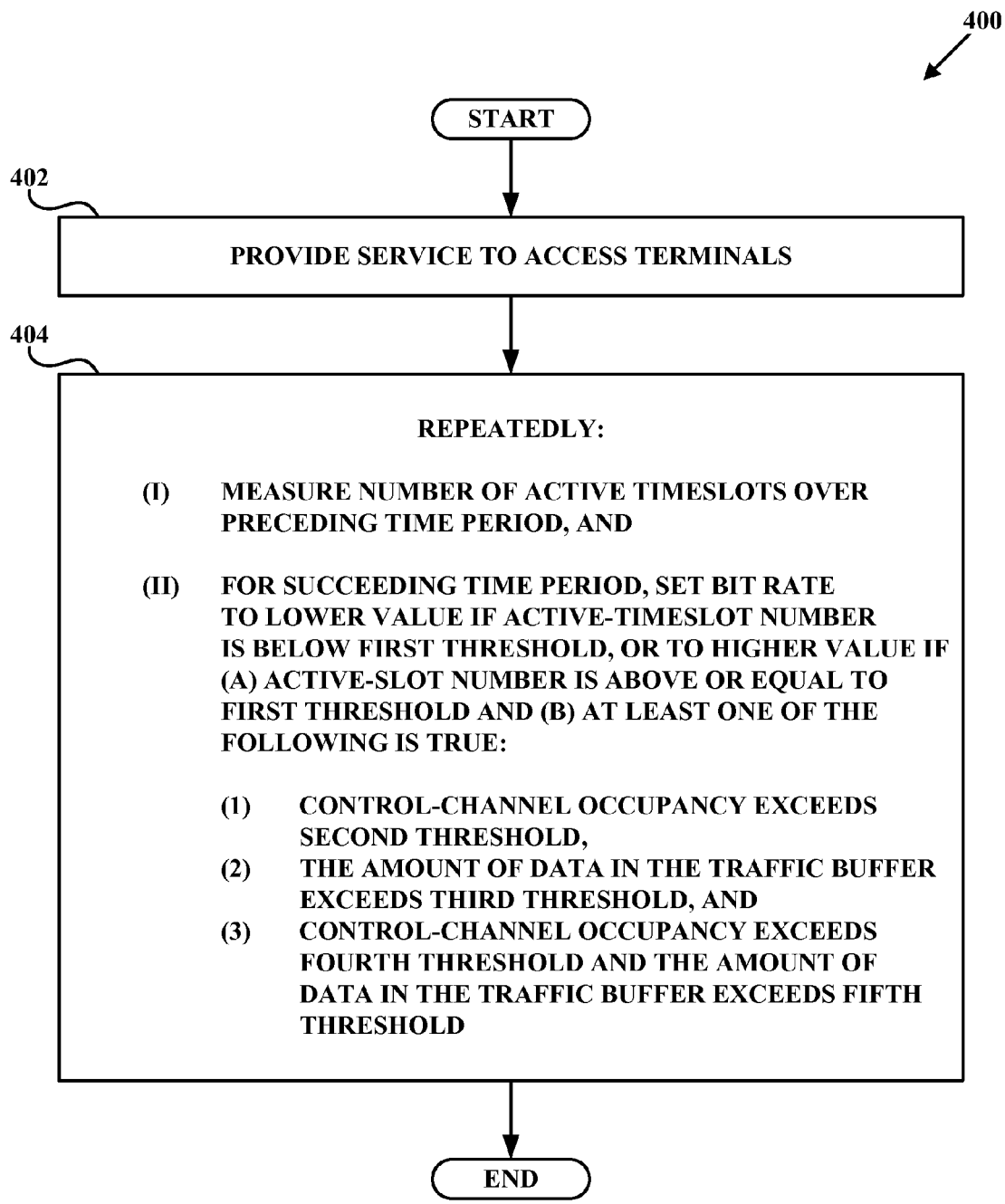
FIG. 4 is a flowchart of a method, in accordance with exemplary embodiments.

FIG. 4 is a flowchart of an exemplary method, in accordance with an exemplary embodiment. As with method 300 of FIG. 3, method 400 of FIG. 4 is described as being carried out by an access node, and by access node 104 of FIG. 1 in particular, though this is not required. Method 400 could be carried out by any one or any combination of the entities described as possibilities for carrying out method 300, and/or any other entity or entities. Method 400 is similar to method 300, and thus is not described in as great of detail.

As shown in FIG. 4, method 400 begins at step 402, when access node 104 provides service to access terminals over a plurality of time periods. That service comprises timeslots that can be active or idle, where active timeslots include a data channel, and idle timeslots do not. The data channel is arranged to carry at least one traffic channel, and is also arranged to carry a control channel at a bit rate. Each time period comprises multiple timeslots.

At step 404, access node 104 repeatedly: (i) determines a measured number of active timeslots over the substantially-immediately-preceding time period, and (ii) for the substantially-immediately-succeeding time period, sets the bit rate to a first value if the measured number is less than a first threshold, or rather to a second value, where the second value is greater than the first value, if (A) the measured number is not less than the first threshold and (B) at least one of the following conditions is true: (a) that a control-channel occupancy of the control channel exceeds a second threshold, (b) that an amount of data in a traffic buffer exceeds a third threshold, and (c) that both (i) the control-channel occupancy exceeds a fourth threshold and (ii) the amount of data in the traffic buffer exceeds a fifth threshold.

Preferably, access node 104 repeatedly sets the bit rate for the next time period based on the last time period. However, in some implementations, with respect to any embodiments of the present invention, the time period for which a bit rate is set and the time period based on which that bit rate is set need not be successive.

4. Conclusion

Various exemplary embodiments have been described above. Those skilled in the art will understand, however, that changes and modifications may be made to those examples without departing from the scope of the claims.

The invention claimed is:

1. A method comprising:
an access node providing service to access terminals on a carrier in a wireless coverage area, wherein the carrier comprises timeslots that can be active or idle, wherein the active timeslots comprise a data channel, wherein the idle timeslots do not comprise a data channel, wherein the data channel of each respective active timeslot can be used (i) to transmit user-traffic information or (ii) to transmit control-channel information at a bit rate that can be set to a first value or a second value, wherein the second value is greater than the first value;
the access node determining a number of active timeslots on the carrier in the wireless coverage area over a first time period;
the access node determining whether the number of active timeslots over the first time period is less than a first threshold;
if the access node determines that the number of active timeslots over the first time period is less than the first threshold, the access node responsively setting the bit rate to the first value for at least a subsequent time period,
wherein, over the subsequent time period, and as compared with the bit rate being set to the second value, the bit rate being set to the first value results in (i) a greater number of timeslots being used to transmit control-channel information and (ii) fewer timeslots being available to transmit user-traffic information; and
if the access node determines that the number of active timeslots over the first time period is not less than the first threshold, the access node responsively setting the bit rate to the second value for at least the subsequent time period if at least one of the following conditions is true:
(a) that a control-channel occupancy of the control channel exceeds a second threshold,
(b) that an amount of data in a traffic buffer exceeds a third threshold, and
(c) that both:
(i) the control-channel occupancy exceeds a fourth threshold, and
(ii) the amount of data in the traffic buffer exceeds a fifth threshold,
wherein, over the subsequent time period, and as compared with the bit rate being set to the first value, the bit rate being set to the second value results in (i) fewer timeslots being used to transmit control-channel information and (ii) a greater number of timeslots being available to transmit user-traffic information.

2. The method of claim 1, wherein the service comprises EV-DO service, and wherein the access terminals comprise EV-DO access terminals.

3. The method of claim 1, wherein the wireless coverage area is a cell or a sector.

4. The method of claim 1, wherein the first value is 38.4 kilobits per second (kbps), and wherein the second value is 76.8 kbps.

5. The method of claim 1, wherein the second value is twice the first value.

6. The method of claim 1, wherein determining the number of active timeslots over the first time period comprises determining how many timeslots transmitted user-traffic information over the first time period.

7. The method of claim 1, wherein determining the number of active timeslots over the first time period comprises determining how many timeslots transmitted at least one of user-traffic information and control-channel information over the first time period.

8. The method of claim 1, carried out by the access node at least one of repeatedly and periodically.

9. An access node comprising:
   a communication interface;
   a processor; and
   data storage comprising instructions executable by the processor for carrying out a set of functions, the set including:
   the access node providing service to access terminals on a carrier in a wireless coverage area, wherein the carrier comprises timeslots that can be active or idle, wherein the active timeslots comprise a data channel, wherein the idle timeslots do not comprise a data channel, wherein the data channel of each respective active timeslot can be used (i) to transmit user-traffic information or (ii) to transmit control-channel information at a bit rate that can be set to a first value or a second value, wherein the second value is greater than the first value;
   the access node determining a number of active timeslots on the carrier in the wireless coverage area over a first time period;
   the access node determining whether the number of active timeslots over the first time period is less than a first threshold;
   if the access node determines that the number of active timeslots over the first time period is less than the first threshold, the access node responsively setting the bit rate to the first value for at least a subsequent time period,
   wherein, over the subsequent time period, and as compared with the bit rate being set to the second value, the bit rate being set to the first value results in (i) a greater number of timeslots being used to transmit control-channel information and (ii) fewer timeslots being available to transmit user-traffic information; and
   if the access node determines that the number of active timeslots over the first time period is not less than the first threshold, the access node responsively setting the bit rate to the second value for at least the subsequent time period if at least one of the following conditions is true:
   (a) that a control-channel occupancy of the control channel exceeds a second threshold,
   (b) that an amount of data in a traffic buffer exceeds a third threshold, and
   (c) that both:
      (i) the control-channel occupancy exceeds a fourth threshold, and
      (ii) the amount of data in the traffic buffer exceeds a fifth threshold,
   wherein, over the subsequent time period, and as compared with the bit rate being set to the first value, the bit rate being set to the second value results in (i) fewer timeslots being used to transmit control-channel information and (ii) a greater number of timeslots being available to transmit user-traffic information.

10. The access node of claim 9, wherein the first value is 38.4 kilobits per second (kbps), and wherein the second value is 76.8 kbps.

11. The access node of claim 9, wherein the second value is twice the first value.

12. The access node of claim 9, wherein determining the number of active timeslots over the first time period comprises determining how many timeslots transmitted user-traffic information over the first time period.

13. The access node of claim 9, wherein determining the number of active timeslots over the first time period comprises determining how many timeslots transmitted at least one of user-traffic information and control-channel information over the first time period.

14. The access node of claim 9, arranged to carry out the set of functions recited in claim 9 at least one of repeatedly and periodically.

* * * * *